Dec. 10, 1963        A. D. GOETTL        3,114,060
RESILIENT MOUNTS FOR ELECTRIC MOTORS
Filed May 10, 1960

INVENTOR.
ADAM D. GOETTL
BY Wm. H. Dean
PATENT AGENT

United States Patent Office 3,114,060
Patented Dec. 10, 1963

3,114,060
RESILIENT MOUNTS FOR ELECTRIC MOTORS
Adam D. Goettl, Phoenix, Ariz., assignor to McGraw-Edison Company, Milwaukee, Wis., a corporation of Delaware
Filed May 10, 1960, Ser. No. 28,131
7 Claims. (Cl. 310—51)

This invention relates to resilient mounts for electric motors and more particularly to resilient mounts for electric motors which are disposed internally of the motor housing and engageable by mounting bracket means insertable through an opening in the side wall of said motor housing whereby the resilient mount structure is protected from damage during shipment or handling of such motors.

Conventional resilient mounts for electric motors are generally located in surrounding relationship with the shaft hubs at the ends of the motors externally of the main motor housing and are vulnerable to damage during handling or shipping of such motors. These motor mounts generally employ resilient structure such as rubber or other equivalent material inu concentric relation with the axis of electric motors, however, the unprotected disposition of such mounts externally of the housing and their connected relation to the usual U-shaped mounting brackets has caused or permitted considerable losses due to damage of such mounts.

Accordingly, it is an object of the present invention to provide a resilient mount for electric motors which is disposed internally of the motor housing and concentric with the axis thereof, whereby a mounting bracket may be extended through openings in the side wall of the motor housing and connected with the resilient motor mount when it is desired to support the motor in a position for operation thereof.

Another object of the invention is to provide a resilient mount for electric motors which employs resilient mounting structure concentric with the axis of the motor and disposed internally of the motor housing whereby brackets extending through openings in the motor housing, engage the resilient mount structure so that in the event the motor is shipped, in connection with various equipment, that the brackets extending through the openings in the housing may engage the housing at the edges of said openings to prevent undue deflection of the resilient structure of the mount thereby preventing damage thereto.

Another object of the invention is to provide a resilient mount for electric motors which is disposed internally of a motor housing in concentric relation with the axis thereof; the structure of said resilient mount being particularly adapted for installation in small electric motors in close proximity to the axis thereof whereby optimum performance of the resilient mount is obtained.

A further object of the invention is to provide a resilient mount for electric motors which may readily be mounted on an inwardly or outwardly projecting bearing supporting structure or bell in electric motors utilizing pressed steel housing members.

Further objects and advantages of the invention may be apparent from the following specification, appended claims and accompanying drawings, in which:

Figure 1:
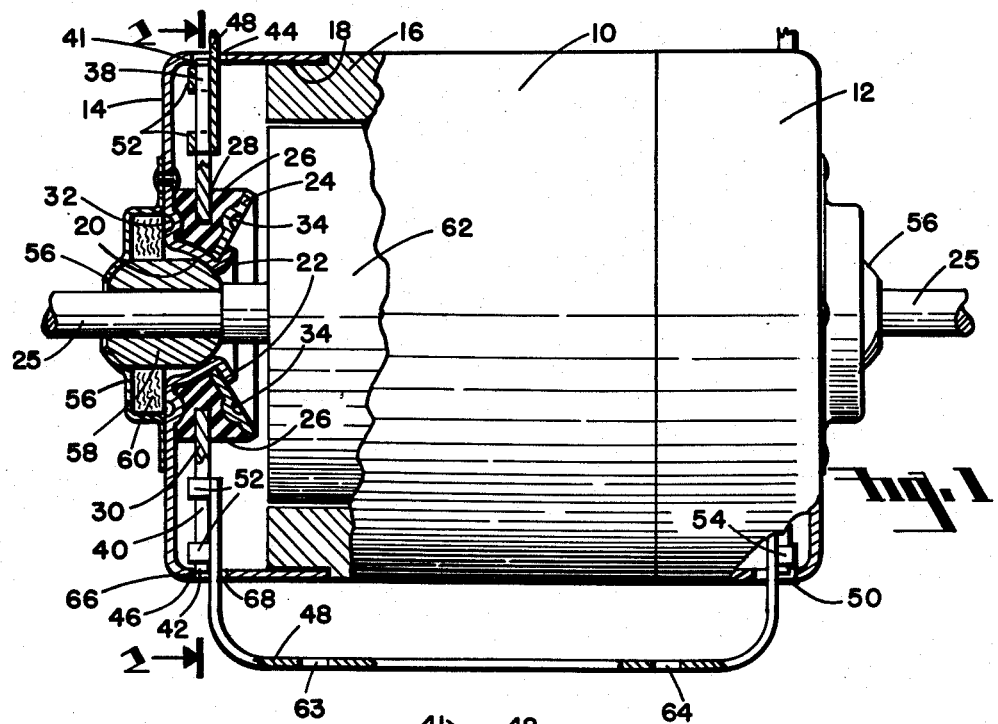
FIG. 1 is a side elevational view of an electric motor showing portions thereof in section and showing the resilient mounts for electric motors, of the invention, internally of the motor housing.

As shown in FIG. 1 of the drawings, an electric motor 10 is provided with pressed steel housing members 12 and 14 disposed on opposite ends of a field structure 16 of the motor. The pressed steel housing members 12 and 14 may be substantially indentical and are generally cup shaped. The outer skirt portion of the housing member 14 is fitted over a reduced diameter portion 18 of the motor field structure 16.

The housing 14 is provided with a concentric spherical bearing supporting portion or bell 20 which is integral therewith and disposed internally of the housing 14. This spherical bearing support 20 is initially formed with a substantially cylindrical portion 22 which extends inwardly and axially of the motor shaft 24, as will be hereinafter described. The portion 22, as shown, has been formed into a conical shape, by means of a die into contiguous relation with a retainer washer 24 which retains an annular resilient mount member 26. This mount member 26 may be made of rubber or any other suitable material. This resilient mount member 26 surrounds the spherical bearing retainer 20 and is provided with an annular groove 28 in which a yoke member 30 is bonded or otherwise secured.

Outwardly of the spherical bearing support portion 20, the housing member is provided with inwardly directed dimpled portions 32 which press into the resilient mount member 26, to resist torsional moments imposed thereon. The ring 24 is also provided with an annular row of inwardly directed dimples 34 which project into the resilient mount member 26 to further resist torsional moments applied thereto.

The resilient mounts 26 are disposed to damp vibration, isolate noise and to resist shock loading of the motor as well as to support it.

Figures 2, 3, 4:
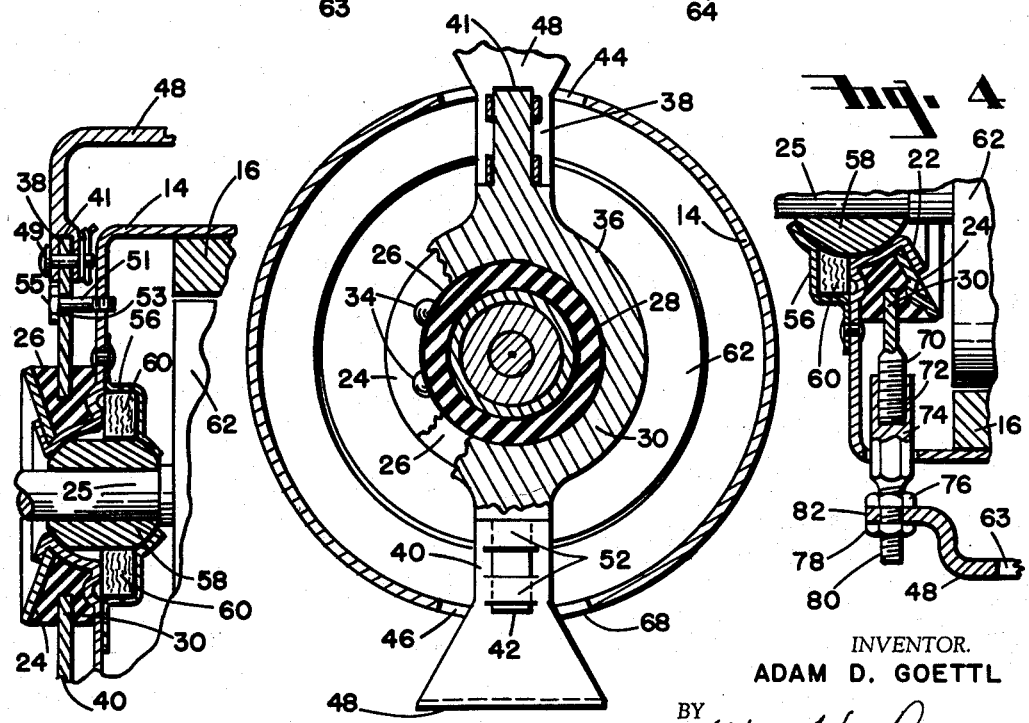
FIG. 2 is a fragmentary sectional view taken from the line 2—2 of FIG. 1 showing portions broken away to amplify the illustration.
FIG. 3 is a fragmentary sectional view taken on the same plane as FIG. 1 showing a showing a modification of the invention.
FIG. 4 is a fragmentary sectional view taken on the same plane as FIG. 1 showing a further modification of the invention.

The yoke 30, as shown in FIG. 2 of the drawings, is provided with a ring shaped portion 36, which surrounds and fits into the annular groove 28 of the resilient mount member 26.

The yoke 30 is provided with oppositely extending arms 38 and 40 which are provided with extending ends 41 and 42 disposed in close proximity to openings 44 and 46 in the side wall of the housing 14. These openings 44 and 46 are disposed to receive arms of motor mount brackets.

As shown in FIG. 1 arms of a motor mount bracket 48 are disclosed projecting through the opening 46 in the housing 14 and a similar opening 50 in the motor housing 12. The bracket 48 is provided with stamped offset portions 52 fitted over the arm 40 and is provided with stamped similar offset portions 54 fitted over an arm similar to the arm disposed on a yoke similar to the yoke 30, located inwardly of the housing 12. It will be understood that a resilient motor mount member similar to the member 26 is disposed internally of the housing 12 and the mount structure may be identical to that described in connection with the resilient mount 26.

Externally of the housing 14 is a bearing retaining cap 56 which is partially spherical and retains a self aligning bearing 58 adjacent to the spherical support 20 of the housing 14. The retainer 56 supports a fibrous oil retainer 60 around the bearing 58.

Mounted on the shaft 24 is a conventional rotor 62 which operates adjacent the field structure 10, hereinbefore described.

It will be understood that the motor mount bracket 48 may be engaged with each of the arms 38 and 40 so that two brackets may be used to support the motor 10. Thus, these brackets 48 may be disposed 180 degrees apart or less and will support the motor laterally of its axis in opposite directions so that the arms 38 and 40 will be retained in the hollow arm portions 52 of the brackets 48.

It will be appreciated by those skilled in the art that various means may be provided to secure the offset portions 52 on the arms 38 and 40 if desired so that a single bracket 48 may be utilized to mount the motor 10.

The bracket 48 is provided with openings 62 and 64 through which bolts may be placed to secure the bracket 48 to structure on which the motor is to be mounted.

It will be understood that when the motor is mounted on structure and shipped or moved about, that deflection of the resilient motor mount 26 by the yoke 30 is limited to an amplitude which will be tolerated by the limits of the openings 44 and 46 in the housing 14 and likewise such openings 50 in the housing 12. Thus, undue deflection of the yoke 30 and resilient mount 26 cannot occur due to the fact that the arms of the bracket 48 will engage opposite limits 66 and 68 of the opening 46 and other similar openings in the housing 12 and 14.

When the motor 10 is shipped alone, the mount 48 may be disconnected so that only the yoke 30 is disposed internally of the respective housing whereby the ends 41 and 42 of the arms 38 and 40, being inwardly of the housing, cannot engage any object which will deflect the yoke 30 and cause damage to the resilient mount member 26.

It will be appreciated by those skilled in the art that the arms 38 and 40, which project in two directions, 180 degrees or less apart from the axis of the motor, will prevent twisting of the mount member 26 when an axial load is applied to the motor 10 due to effects of inertia during handling or shipping. The yoke 30 under such conditions with both brackets 48 in position and engaging both arms 38 and 40, will deflect axially of the motor and merely place the resilient mount 26 under compression at one side of the yoke 30.

In the modification as shown in FIG. 3, the resilient mount 26 is on the outer end of the motor and the yoke 30 together with its arms 38 and 40 are also disposed outwardly of the housing 14. It will be noted that the outermost ends 41 and 42 of the arms 38 and 40 are disposed at a radius which is less than that of the motor to afford protection to said arms when the mount 48 is disconnected therefrom and during shipment. It will be noted that the bracket is removably connected with said yoke by pins 49.

A bolt 51 is extended through an arcuate slot 53 in each arm of the yoke 30. This bolt is provided with a head 55 which supports the outer side of the yoke 30 adjacent the slot 53. The inner end of the bolt 51 is screw threaded into the housing 14 so that it is stationary and thus prevents undue deflection of the resilient mount whereby damage thereof is prevented.

In the modification of the invention as shown in FIG. 4, the yoke 30 may be provided with externally screw threaded arms 70. These arms 70 are engaged by internally screw threaded portions 72 of bolts 74. Jam nuts 76 and 78 are screw threadably engaged externally of an externally threaded portion 80 of each bolt 74. The jam nuts 76 and 78 are jammed on opposite sides of a modified offset portion 82 of the motor mount 48.

It will be obvious to those skilled in the art that various modifications of the present invention may be resorted to in a manner limited only by a just interpretation of the following claims.

I claim:

1. In resilient mounts for electric motors the combination of: a motor housing; means fixed relative to said housing supporting a motor shaft therein; resilient means connected to said housing internally thereof near each end of said motor and concentric with said means for supporting said shaft; said housing having openings outwardly of said resilient means and brackets extending through said openings and coupled to said resilient means; said brackets removably connected to said resilient means internally of said housing; said resilient means totally disposed internally of said motor housing.

2. In resilient mounts for electric motors the combination of: a motor housing; means fixed in the end thereof for supporting a motor shaft bearing; resilient means connected to said housing internally thereof surrounding said first means and concentric with the axis of the motor; a yoke member secured to said resilient means and having projecting arms directed radially internally of said housing; said housing having openings therein outwardly of said arms and substantially aligned therewith; and bracket means extending through said openings and removably connected to said arms of said yoke internally of said housing.

3. In resilient mounts for electric motors the combination of: a motor housing; means fixed in the end thereof for supporting a motor shaft bearing; resilient means connected to said housing internally thereof surrounding said first means and concentric with the axis of the motor; a yoke member secured to said resilient means and having projected arms directed radially internally of said housing; said housing having openings therein outwardly of said arms and substantially aligned therewith; and bracket means extending through said openings and removably connected to the arms of said yoke; said bearing support means comprising an inwardly extending pressed steel portion of said housing, said resilient means comprising a rubber ring surrounding said bearing support means.

4. In resilient mounts for electric motors the combination of: a motor housing; means fixed in the end thereof for supporting a motor shaft bearing; resilient means connected to said housing internally thereof surrounding said first mentioned means and concentric with the axis of the motor; a yoke member secured to said resilient means and having projected arms directed radially internally of said housing; said housing having openings therein outwardly of said arms and substantially aligned therewith; and bracket means extending through said openings and removably connected to the arms of said yoke; said bearing support means comprising inwardly extending pressed steel portion of said housing, said resilient means comprising a rubber ring surrounding said bearing support means; a ring engaging one side of said resilient means; said ring fitted over said inwardly projecting bearing support means; a portion of said bearing support means flared radially against said ring to clamp said resilient means in position concentrically of said bearing support means.

5. In resilient mounts for electric motors the combination of: a motor housing; means for supporting a motor shaft therein; a resilient mount support on said housing near each end of said motor and concentric with said means for supporting said shaft; a yoke on each of said resilient means and each yoke having an extending portion disposed on a radius shorter than that of said motor, each extending portion terminating inwardly of the periphery or extremity of said housing; and a motor mount means removably connected to said extending portions.

6. In resilient mounts for electric motors the combination of: a motor housing; means for supporting a motor shaft therein; a resilient mount support on said housing near each end of said motor and concentric with said means for supporting said shaft; a yoke on each of said resilient means and each yoke having an extending portion disposed on a radius shorter than that of said motor, each extending portion terminating inwardly of the periphery or extremity of said housing; and a motor mount means removably connected to said extending portions; and means disposed to limit deflection of said yoke relative to said housing.

7. In resilient mounts for electric motors the combination of: a motor housing having rotor shaft bearing support portions; bearings mounted therein; a rotor shaft supported rotatably in said bearings; said bearings support portions comprising pressed steel portions of said housing; resilient motor mount means comprising rubber like rings surrounding said bearing support portions; metal rings engaging one side of each of said rubber like resilient rings; said metal rings fitted over said pressed steel bearing support portions; and portions of said bearing support portions flared radially against said metal rings to clamp said resilient rubber like rings in position concentrically of said bearing support portions.

References Cited in the file of this patent

UNITED STATES PATENTS

| | | |
|---|---|---|
| 2,098,073 | Tucker | Nov. 2, 1937 |
| 2,136,301 | Hoddy et al. | Nov. 8, 1938 |
| 2,607,819 | Sutton | Aug. 19, 1952 |

FOREIGN PATENTS

| | | |
|---|---|---|
| 1,038,642 | Germany | Sept. 11, 1958 |